United States Patent [19]
Hashimoto

[11] Patent Number: 5,384,761
[45] Date of Patent: Jan. 24, 1995

[54] OPTICAL DISC PLAYER HAVING A DISK OFFSET DETECTION AND PROTECTION

[75] Inventor: Minoru Hashimoto, Kanagawa, Japan

[73] Assignee: Sony Corporation, Tokyo, Japan

[21] Appl. No.: 787,589

[22] Filed: Nov. 4, 1991

[30] Foreign Application Priority Data

Nov. 16, 1990 [JP] Japan .................. 2-308514

[51] Int. Cl.$^6$ ........................... G11B 7/00
[52] U.S. Cl. ............... 369/44.26; 369/44.32; 369/50
[58] Field of Search ........... 369/44.26, 50, 51, 44.32, 369/32, 44.27, 44.28, 44.29; 360/73.03; 318/603, 600, 569, 626

[56] References Cited

U.S. PATENT DOCUMENTS

| | | | |
|---|---|---|---|
| 4,550,347 | 10/1985 | Nakamuta | 369/50 |
| 4,672,595 | 6/1987 | Senso | 369/50 |
| 4,809,248 | 2/1989 | Sengoku | 360/73.03 |
| 4,815,063 | 4/1989 | Aoshima et al. | 369/50 |
| 4,881,215 | 11/1989 | Horie | 369/44.26 |
| 4,908,561 | 3/1990 | Hashimoto | 318/603 |
| 4,955,008 | 9/1990 | Collomby et al. | 369/47 |
| 4,959,733 | 9/1990 | Miura et al. | 360/73.03 |

*Primary Examiner*—Aristotelis Psitos
*Assistant Examiner*—Nabil Hindi
*Attorney, Agent, or Firm*—Limbach & Limbach

[57] ABSTRACT

An optical disk player is provided which includes a disk driving unit for driving an optical disk, a traverse count circuit for counting the number of recording tracks on the optical disk traversed by an optical pickup, an angle detection circuit for detecting the rotational angle through which the optical disk is rotated, and a stop control unit supplied with a count output from the traverse counting unit and a detection output from the angle detection unit. The stop control unit checks to see if the count value by the traverse count unit during rotation by a predetermined angle of the optical disk by the disk driving unit reaches a predetermined number of tracks corresponding to an allowable offset. The stop control unit halts the driving of the optical disk if the count value reaches the aforementioned predetermined number of tracks.

5 Claims, 2 Drawing Sheets

OPTICAL DISC PLAYER HAVING A DISK OFFSET DETECTION AND PROTECTION

BACKGROUND OF THE INVENTION

This invention relates to an optical disk player, such as a compact disk player or a video disk player, which is provided with disk driving means on which an optical disk may be loaded detachably.

In general, in an optical disk player employing an optical disk as a recording medium, information signals may be recorded or reproduced by tracing recording track(s) on the disk by an optical head whilst the disk is rotated at a high velocity by disk driving means.

The optical disk player, such as a compact disk player or a video disk player, is provided with disk driving means provided in turn with a disk table, on which an optical disk may be loaded detachably, so that a selected optical disk may be optionally loaded thereon for reproduction. With this type of disk player, the optical disk is transported by a disk tray or the like into the inside of a disk player and loaded on the disk driving means by a chuck system operating on the basis of a force of magnetic attraction exerted by a magnet provided on the disk player or an urging force exerted by a spring.

Meanwhile, with the optical disk player, such as the compact disk player or the video disk player, in which the optical disk is transported by the disk tray or the like so as to be loaded on the disk driving means, as described above, the optical disk may be loaded on the disk driving means with an offset of the optical disk with respect to the center of rotation of the disk table, as may occur when the disk is placed at an incorrect position on the disk tray. If the disk is loaded in this manner with an offset of the center of the disk, and the disk is rotated at this position at a high velocity, there is a risk that not only signal reproduction is not made, but also the optical disk itself be destroyed.

SUMMARY OF THE INVENTION

It is an object of the present invention to provide an optical disk player in which it is possible to prevent a situation in which the optical disk may be loaded with an offset of the center of the disk with respect to the center of rotation of the disk table so as to be rotated in this state at a high velocity by disk driving means.

In accordance with the present invention, there is provided an optical disk player comprising disk driving means on which an optical disk is detachably loaded, traverse detecting means for detecting that a recording track on said optical disk loaded on said disk driving means is traversed by an optical pickup, traverse count means for counting the number of recording tracks traversed by said optical pickup on the basis of a detection output by said traverse detection means, angle detection means for detecting that said optical disk has been rotated a predetermined angle by said disk driving means, and stop control means supplied with a count output from said traverse counting means and a detection output from said angle detection means, said stop control means checking if the count value by said traverse counting means during rotation by a predetermined angle of said optical disk by said disk driving means reaches a predetermined number of tracks corresponding to an allowable offset, said stop control means stopping the driving of said optical disk if said count value reaches said predetermined number of tracks.

BRIEF DESCRIPTION OF THE INVENTION

DETAILED DESCRIPTION OF THE PREFERRED EMBODIMENT

Figure 1:
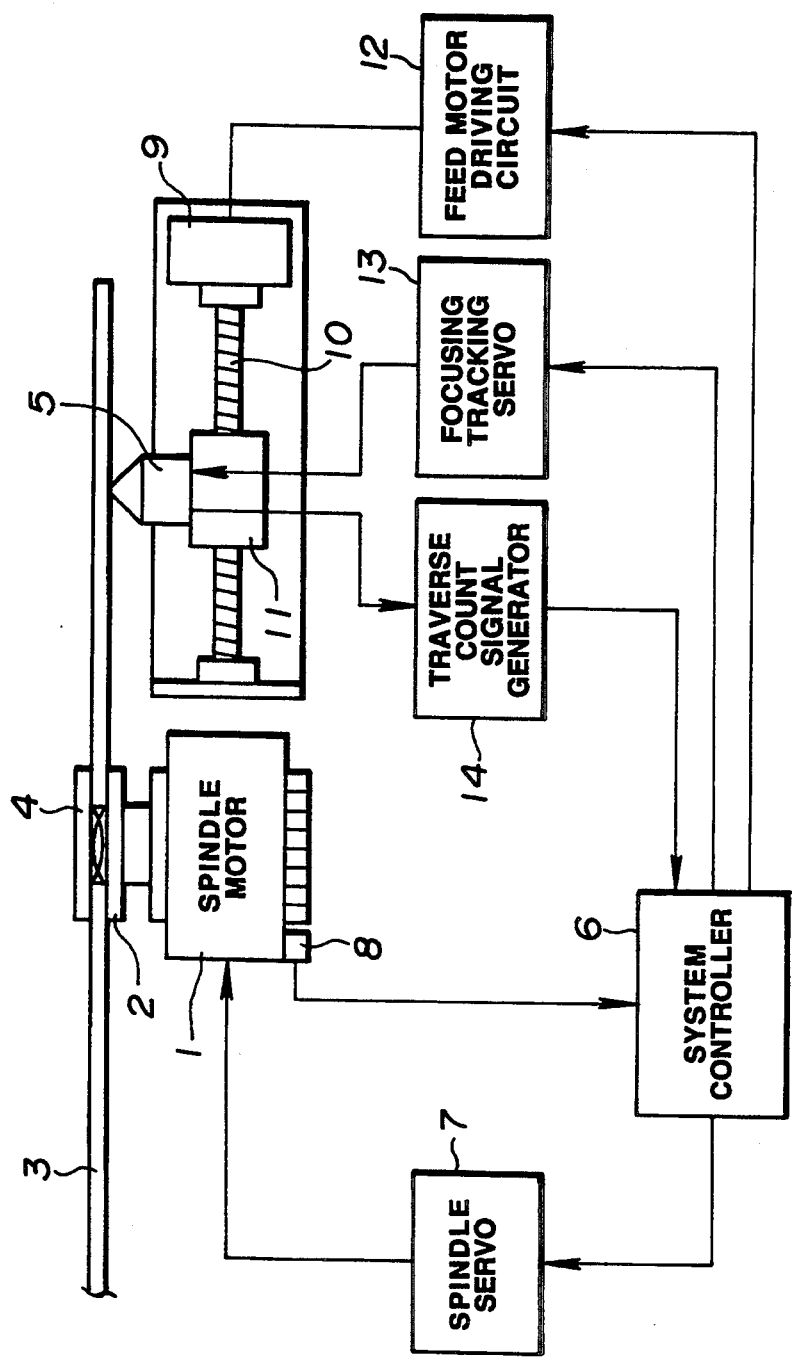
FIG. 1 is a block diagram showing an optical disk player according to the present invention.

An optical disk player of the present invention is constructed as shown in a block diagram in FIG. 1.

With the optical disk player, shown in FIG. 1, the present invention is applied to a disk player in which an optical disk 3 is detachably loaded by a chucking magnet 4 on a disk table 2 rotationally driven by a spindle motor 1 so that signals recorded on the disk 3 will be detected by an optical pickup 5 for reproduction.

The spindle motor 1 is driven at a high speed by a spindle servo circuit 7 controlled in operation by a system controller 6 so that the linear velocity of the recording track on the optical disk 3 will be constant. The spindle motor 1 is provided with a frequency generator 8 adapted for generating, for example, 24 frequency signals per each revolution of the disk 3. The frequency signals generated by the frequency generator 8 are supplied to the system controller 6. The frequency generator 8 thus acts as means for detecting the rotation angle of the disk 3, i.e. the angular amount by which the disk 3 is rotated between two points in time.

The optical pickup 5 is mounted on a feed table 11 threadedly engaged by a feed screw 10 rotationally driven by a feed motor 9 and is moved along the radius of the disk 3 by the movement of the feed table 11 caused by rotational driving of the feed screw 10. Driving control of the feed motor 9, that is feed control of the optical pickup 5, is achieved by controlling the operation of a motor driving circuit 12 driving the feed motor 9 by the system controller 6. The optical pickup 5 has its object lens shifted in both the focusing controlling direction and the tracking controlling direction by a so-called biaxial device, not shown, in such a manner that focusing servo control and tracking servo control operations for the object lens may be effected by a focusing tracking servo circuit 13 operationally controlled by the system controller 6. The optical pickup 5 is adapted for irradiating the optical disk 3 with a laser light for detecting the reflected laser light from the disk 3. A detection output of the optical pickup 5 is supplied to a signal processing system, not shown, while tracking error signals for recording track(s) on the optical disk 3, produced on the basis of the detection output, are supplied to a traverse count signal generator 14.

The traverse count signal generator 14 detects zero-crossing of the tracking error signals to produce a traverse count signal indicating that the optical pickup 5 has traversed a recording track on the optical disk 3 loaded on the disk table 2. The traverse count signal generated by the traverse count signal generator 14 is supplied to the system controller 6.

Figure 2:
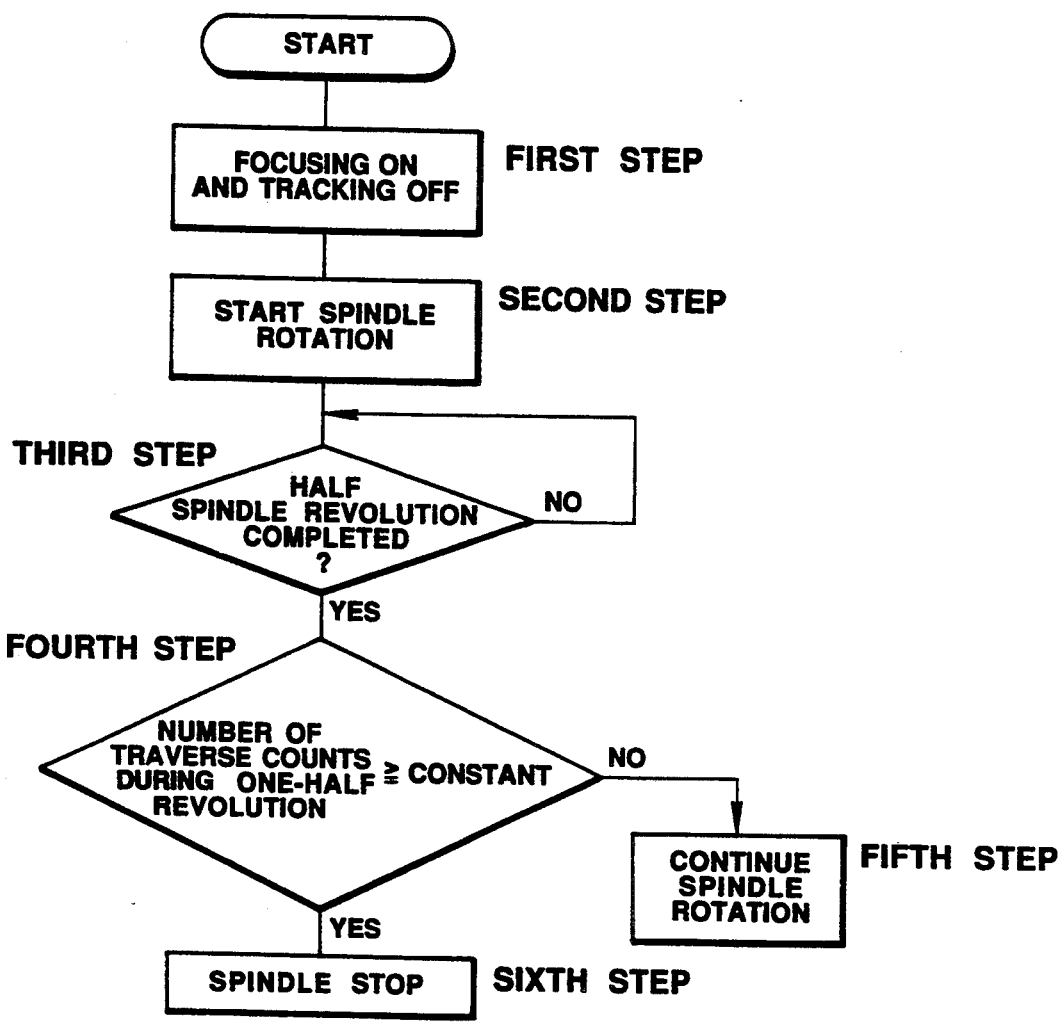
FIG. 2 is a flow chart for illustrating a control operation of a system controller of the optical disk player shown in FIG. 1.

Whilst the optical disk 3 loaded on the disk table 2 is rotated at a high velocity by the spindle motor 1, the system controller 6 performs a control operation as illustrated in a flow chart of FIG. 2.

Specifically, when the spindle motor 1 is driven at a high velocity by the spindle servo circuit 7, system controller 6 first controls, at a first step, the operation of the focusing tracking servo circuit 13 so that the focusing servo is energized and the tracking servo is deenergized.

At a second step, system controller 6 controls the operation of the spindle servo circuit 7 to start the rotation of the spindle motor 1, while simultaneously starting the counting of frequency signals from the frequency generator 8 and the traverse count signals from the traverse count signal generator 14.

At a third step, system controller 6 checks to see if a count $n_1$ of the frequency signals from the frequency generator 8 has reached a preset value $N_1$. At this third step, the preset value $N_1$ is set to, for example, 12, in order to check to see if the spindle motor 1 has made one-half revolution. If the result of the checking in negative, the operation of checking of the third step is repeated. At a time point when the count $n_1$ of the frequency signals has reached the preset value $N_1$, that is when the spindle motor 1 has made one-half revolution, system controller proceeds to the next fourth step.

At this fourth step, it, is checked if a count $n_2$ of the traverse count signal from the traverse count signal generator 14 has reached a preset value $N_2$. It is noted that the preset value $N_2$ indicates a preset number of tracks corresponding to the allowable offset in the present disk apparatus. For example, if the track pitch of the optical disk 3 is 1.7 µm and an allowable offset is 1 mm, $N_2$ is given by $$N_2 = 1 \text{ mm} \times 2/1.7 \text{ µm} = 1176$$

That is, at this fourth step, it is checked if the number of recording tracks $n_2$ indicating the number of recording tracks on the optical disk 3 traversed by the optical pickup 5 has reached the preset value $N_2$ corresponding to the allowable offset during the time when the spindle motor 1 has completed one-half revolution.

If the result of check of the fourth step is negative, that is if the optical disk 3 loaded on the disk table 2 is rotated in a normal state with an amount of offset less than the allowable offset, system controller 6 proceeds to the fifth step to continue with driving of the spindle motor 1 to effect high speed revolutions of the optical disk 3.

If the result of check at the fourth step is affirmative, that is if the optical disk 3 is loaded in an abnormal state on the disk table 2 in which the optical disk 3 is rotated with an amount of offset more than the allowable offset, system controller 6 proceeds to the sixth step to control the operation of the spindle servo circuit 7 to stop the driving of the spindle motor 1.

From the foregoing it is seen that, with the present optical disk player, if the optical disk 3 is loaded on the disk table 2 in an abnormal state in which the disk offset exceeds the allowable offset, such an unusual disk loading state is sensed during the low speed rotation of the optical disk until the disk completes one-half revolution to stop the driving of the spindle motor 1 immediately to prevent the optical disk 3 from being injured, as well as to prevent a dangerous situation in which the optical disk 3 is rotated at an elevated velocity while being in an unusual loading state.

What is claimed is:

1. An optical disk player for stopping the driving of an optical disc when it is incorrectly loaded comprising disk driving means on which an optical disk is detachably loaded;
    traverse detecting means for detecting that a recording track on said optical disk loaded on said disk driving means is traversed by an optical pickup and producing a corresponding detection output;
    traverse counting means for counting the number of recording tracks traversed by said optical pickup on the basis of the detection output by said traverse detection means and producing a corresponding count value output;
    angle detection means for detecting that said optical disk has been rotated a predetermined angle by said disk driving means and producing a corresponding angle detection output; and
    stop control means connected to the disk driving means and supplied with the count value output from said traverse counting means and the angle detection output from said angle detection means, for detecting when the count value output by said traverse counting means during rotation by a predetermined angle of said optical disk by said disk driving means reaches a predetermined number of tracks corresponding to a predetermined allowable offset of a position of the optical disk on the disk driving means and stopping the driving of said optical disk by the disk driving means when said count value output reaches said predetermined number of tracks.

2. The optical disk player as claimed in claim 1 further comprising means for producing tracking error signals with respect to a recording track on said optical disk on the basis of a detection output of a light reflected from the optical disk and supplying the tracking error signals to said traverse counting means to produce traverse count signals based on the detection of zero-crossings of said tracking error signals by said traverse counting means for counting the number of recording tracks on said optical disk traversed by said optical pickup.

3. The optical disk player as claimed in claim 1 wherein the disk driving means includes a spindle motor and the traverse counting means begins counting the number of recording tracts with the start of rotation of the spindle motor for rotating the optical disk.

4. The optical disk as claimed in claim 3 wherein the traverse counting means counts the number of recording tracks crossed while simultaneously counting frequency signals from a frequency generator provided in said spindle motor.

5. The optical disk player as claimed in claim 1 wherein the stop control means detects when the count value output by said traverse counting means reaches the predetermined number of tracks corresponding to the predetermined offset during a time period between the start of rotation and the completion of one-half revolution of said optical disk by the disk driving means.

* * * * *